United States Patent
Chen et al.

(10) Patent No.: US 10,185,186 B2
(45) Date of Patent: Jan. 22, 2019

(54) ULTRA-THIN LIQUID CRYSTAL DISPLAY

(71) Applicant: Shenzhen China Star Optoelectronics Technology Co., Ltd., Shenzhen (CN)

(72) Inventors: Lixuan Chen, Shenzhen (CN); Yuchun Hsiao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 219 days.

(21) Appl. No.: 15/128,199

(22) PCT Filed: Jul. 14, 2016

(86) PCT No.: PCT/CN2016/090075
§ 371 (c)(1),
(2) Date: Sep. 22, 2016

(87) PCT Pub. No.: WO2017/206284
PCT Pub. Date: Dec. 7, 2017

(65) Prior Publication Data
US 2018/0224682 A1    Aug. 9, 2018

(30) Foreign Application Priority Data
May 31, 2016   (CN) .......................... 2016 1 0377931

(51) Int. Cl.
*G02F 1/1333*   (2006.01)
*G02F 1/1343*   (2006.01)
(Continued)

(52) U.S. Cl.
CPC ............ *G02F 1/1343* (2013.01); *G02F 1/136* (2013.01); *G02F 1/1333* (2013.01);
(Continued)

(58) Field of Classification Search
CPC ... G02F 1/133308; G02F 2001/133317; G02F 2001/133314
See application file for complete search history.

(56) References Cited

U.S. PATENT DOCUMENTS

2008/0137005 A1   6/2008  Kim
2011/0019121 A1*  1/2011  Mo ................... G02F 1/133308
                                                            349/58
(Continued)

FOREIGN PATENT DOCUMENTS

CN          1940654         4/2007
CN        101109866         1/2008
(Continued)

OTHER PUBLICATIONS

International Search Report for PCT/CN2016/090075, Completed by the Chinese Patent Office on Feb. 9, 2017, 12 Pages.

*Primary Examiner* — Phu Vu
(74) *Attorney, Agent, or Firm* — Mintz Levin Cohn Ferris Glovsky and Popeo, P.C.; Kongsik Kim

(57) ABSTRACT

An ultra-thin liquid crystal display including: a liquid crystal panel, a backlight module disposed opposite to the liquid crystal panel, and a metal frame for fixedly coupling the liquid crystal panel and the backlight module. The liquid crystal panel includes: a color filter substrate disposed opposite to the backlight module, an array substrate positioned between the backlight module and the color filter substrate and disposed by box with the color filter substrate, and a chip-on-film (COF), wherein the array substrate includes an extension part formed by extending one side thereof, wherein a screen electrode is formed on the extension part, an electrode on the COF is bonded with the screen electrode, and the COF is attached to the metal frame. The
(Continued)

ultra-thin LCD achieves the thinning design while having an advantage of high heat dissipation efficiency.

9 Claims, 3 Drawing Sheets

(51) Int. Cl.
  *G02F 1/1335* (2006.01)
  *G02F 1/136* (2006.01)
(52) U.S. Cl.
  CPC .. *G02F 1/133308* (2013.01); *G02F 1/133514* (2013.01); *G02F 2001/133314* (2013.01); *G02F 2001/133317* (2013.01); *G02F 2201/123* (2013.01)

(56) References Cited

U.S. PATENT DOCUMENTS

| | | | | |
|---|---|---|---|---|
| 2013/0181246 A1* | 7/2013 | Wu | ........................ | G02B 6/001 |
| | | | | 257/98 |
| 2014/0169033 A1* | 6/2014 | Yu | ....................... | H05K 7/20409 |
| | | | | 362/611 |
| 2016/0327841 A1* | 11/2016 | Jia | ........................... | G02F 1/133 |

FOREIGN PATENT DOCUMENTS

| | | |
|---|---|---|
| CN | 201174013 | 12/2008 |
| CN | 102042534 | 5/2011 |
| KR | 20070010408 | 1/2007 |

\* cited by examiner

ULTRA-THIN LIQUID CRYSTAL DISPLAY

CROSS-REFERENCE TO RELATED APPLICATION

This application is the U.S. national phase of PCT Application No. PCT/CN2016/090075filed on Jul. 14, 2016, which claims priority to CN Patent Application No. 201610377931.2 filed on May 31, 2016, the disclosures of which are incorporated in their entirety by reference herein.

TECHNICAL FIELD

The present disclosure relates to a liquid crystal display technical field, and more particularly, to an ultra-thin liquid crystal display.

BACKGROUND ART

With the evolution of photoelectric and semiconductor technologies, the flourishing development of a flat panel display is driven, and in various flat panel displays, liquid crystal displays (LCDs) have been applied to many aspects of the production and living, because of having various superior characteristics, such as high space utilization, low power consumption, no radiation and low electro-magnetic interference, and the like.

Since people seek the thinness of the display, the ultra-thin LCD has become a hot spot of the market. One of the core tasks of a display engineer is how to design a ultra-thin LCD.

SUMMARY

In order to resolve the above problem, the present disclosure provides an ultra-thin LCD capable of achieving a thinning design.

An aspect of the present disclosure provides an ultra-thin LCD, including: a liquid crystal panel, a backlight module disposed opposite to the liquid crystal panel, and a metal frame for fixedly coupling the liquid crystal panel and the backlight module. The liquid crystal panel includes: a color filter substrate disposed opposite to the backlight module, an array substrate positioned between the backlight module and the color filter substrate and disposed by box with the color film substrate, and a chip-on-film (COF). The array substrate includes an extension part formed by extending one side thereof, wherein a screen electrode is formed on the extension part. An electrode on the COF is bonded with the screen electrode, and the COF is attached to the metal frame.

Optionally, the backlight module includes: a glass plate disposed opposite to the array substrate, and having a light incident side surface; and a LED light source disposed adjacent to the light incident side surface and opposite to the COF.

Optionally, the backlight module further includes a total reflection layer disposed on a surface of the glass plate facing the array substrate to totally reflect light emitted from the LED light source to the surface of the glass plate facing the array substrate.

Optionally, a refractive index of the total reflection layer is less than a refractive index of the glass plate.

Optionally, the total reflection layer is made of $SiO_2$ material.

Optionally, the backlight module further includes a protection layer disposed on the surface of the total reflection layer facing the array substrate to protect the total reflection layer.

Optionally, the metal frame includes: a vertical part, and first and second horizontal parts formed by extending both opposite sides of the vertical part in a direction perpendicular to the vertical part, wherein the first horizontal part is clamped on the liquid crystal panel, the second horizontal part is clamped on the backlight module, and the COF is attached to the vertical part.

Optionally, the LED light source is positioned above the second horizontal part, and between the vertical part and the light incident side surface.

Optionally, the backlight module further includes a reflection sheet disposed on a surface of the glass plate opposite to the array substrate to reflect the light emitted from the LED light source to the surface of the glass plate opposite to the array substrate back to the glass plate.

Optionally, one COF is disposed opposite to at least two LED light sources.

The ultra-thin LCD according to the present disclosure achieves the thinning design while having an advantage of high heat dissipation efficiency.

BRIEF DESCRIPTION OF THE DRAWINGS

These and/or other aspects, characteristics and advantages of the embodiments in the present disclosure will become more apparent from the following description, taken in conjunction with the accompanying drawings in which.

DETAILED DESCRIPTION OF EXEMPLARY EMBODIMENTS

The embodiments of the present disclosure will be described hereinafter in details with reference to the accompanying drawings. The embodiments of the present disclosure may, however, be embodied in various different forms and should not be construed as limited to the embodiments set forth herein. Rather, these embodiments are provided for explaining the principle and actual application of the present disclosure, and thus those skilled in the art can understand various embodiments and amendments which are suitable for specific intended applications of the present disclosure.

Figure 1:
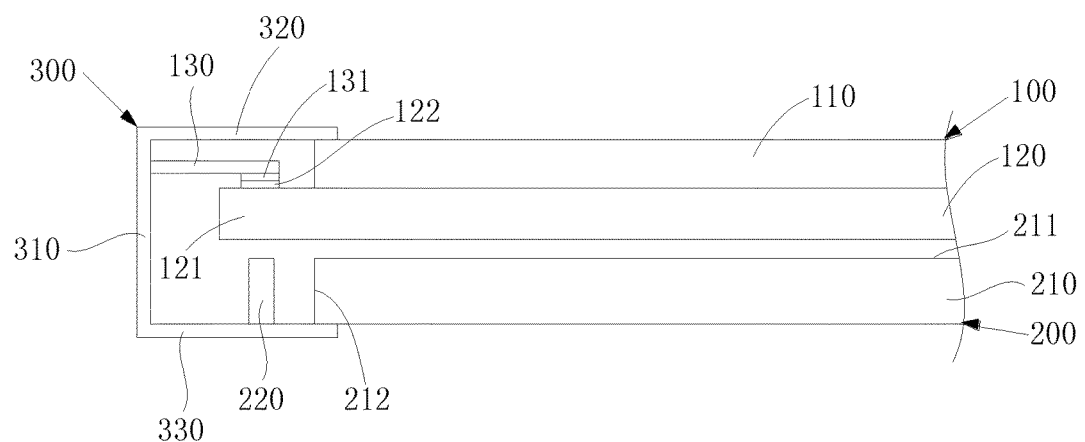
FIG. 1 is a structure diagram of an ultra-thin liquid crystal display according to an embodiment of the present disclosure.
Figure 2:
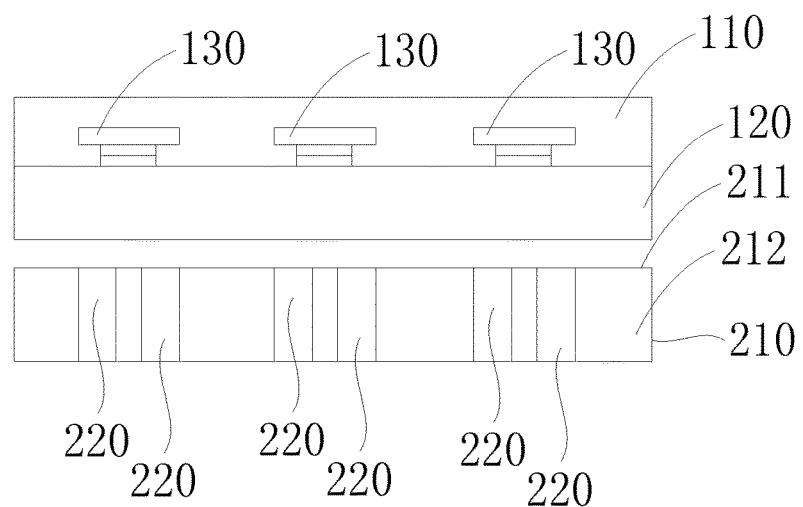
FIG. 2 is a left view of FIG. 1.

FIG. 1 is a structure diagram of an ultra-thin liquid crystal display according to an embodiment of the present disclosure. FIG. 2 is a left view of FIG. 1. In FIG. 2, the metal frame is omitted for the purpose of easily showing a Chip-on-Film (COF) that is packaged and a LED light source.

Referring to FIG. 1, an ultra-thin liquid crystal display according to an embodiment of the present disclosure includes: a liquid crystal panel 100, a backlight module 200, and a metal frame 300. Here, preferably, the metal frame 300 is made of a metal material having higher heat dissipation efficiency.

When the liquid crystal panel 100 is disposed opposite to the backlight module 200, the metal frame 300 fixedly combines the liquid crystal panel 100 and the backlight module 200 that are opposite to each other, thereby constructing the ultra-thin LCD of the present embodiment.

In particular, the liquid crystal panel 100 is manufactured by using a current manufacturing technique of a liquid crystal panel. In the present embodiment, the liquid crystal panel 100 includes: a color filter substrate (CF) substrate 110, an array substrate 120, and a COF 130.

The CF substrate 110 and the array substrate 120 are disposed by box. When the liquid crystal panel 100 is disposed opposite to the backlight module 200, the array substrate 120 faces the backlight module 200, that is, the CF substrate 110 is opposite to the backlight module 200. It should be noted that the liquid crystal panel 100 may further include a liquid crystal layer (not shown) disposed between the CF substrate 110 and the array substrate 120 after box, wherein the liquid crystal layer includes liquid crystals (not shown).

In the present embodiment, the CF substrate 110 and the array substrate 120 each have some general structures. For example, the CF substrate 110 includes but is not limited to color filter elements, such as a red (R) filter element, a green (G) filter element, a blue (B) filter element or the like, a Black Matrix (BM), an alignment film layer, or the like. but not limited hereto. The array substrate 120 includes but is not limited to a thin film transistor (TFT), a pixel electrode, an alignment film layer, or the like.

The array substrate 120 includes an extension part 121 formed by extending one side thereof, wherein the extension part 121 exceeds the CF substrate 110. A screen electrode 122, which is served as a transfer media to provide signals to the respective elements in the CF substrate 110 and the array substrate 120 from the COF 130, is formed on the extension part 121. When the COF 130 is assembled on the extension part 121, an electrode 131 on the COF 130 is bonded with the screen electrode 122, such that a chip on the COF 130 processes a signal received from an external signal source (not shown), and then transmits the processed signal to the respective elements in the CF substrate 110 and the array substrate 120 via the electrode 131 and the screen electrode 122. Moreover, the COF 130 is further attached to the metal frame 300 to facilitate the heat dissipation of the COF 130. It should be noted that the number of the COFs 130 may be set according to the practical needs, for example, as shown in FIG. 2, three COFs 130 are provided.

The backlight module 200 includes a glass plate 210 and a LED light source 220.

A surface of the glass plate 210 facing the array substrate 120 is defined as a light emission surface 211, and a side surface of the glass plate 210 perpendicular and connected to the light emission surface 211 is defined as a light incident side surface 212. The LED light source 220 is disposed adjacent to the light incident side surface 212 and is disposed opposite to the COF 130. Thus, the light emitted from the LED light source enters the glass plate 210 via the light incident side surface 212, and is emitted from the light emission surface 211 to the liquid crystal panel 100 for the display of the liquid crystal panel 100. It should be noted that the number of the LED light sources 220 may be set according to the practical needs. In addition, the COF 130 is disposed opposite to any number of the LED light sources 220. For example, as shown in FIG. 2, the COF 130 may be disposed opposite to two LED light sources 220.

The metal frame 300 includes a vertical part 310, a first horizontal part 320, and a second horizontal part 330.

The first horizontal part 320 and the second horizontal part 330 are disposed opposite to each other, and positioned at both opposite sides of the vertical part 310, respectively. When the metal frame 300 fixedly couples the liquid crystal panel 100 and the backlight module 200 that are opposite to each other, the first horizontal part 320 is clamped on a surface of the CF substrate 110 opposite to the array substrate 120, the second horizontal part 330 is clamped on a surface of the glass plate 210 opposite to the array substrate 120 (i.e., a bottom surface of the glass plate 210 opposite to the light emission surface 211), and the COF 130 is attached to the vertical part 310.

Thus, the LED light source 220 is disposed on the second horizontal part 330, and positioned between the vertical part 310 and the light incident side surface 212. Since the LED light source 220 is directly loaded on the second horizontal part 330, it is helpful for the heat dissipation of the LED light source 220.

Figure 3:
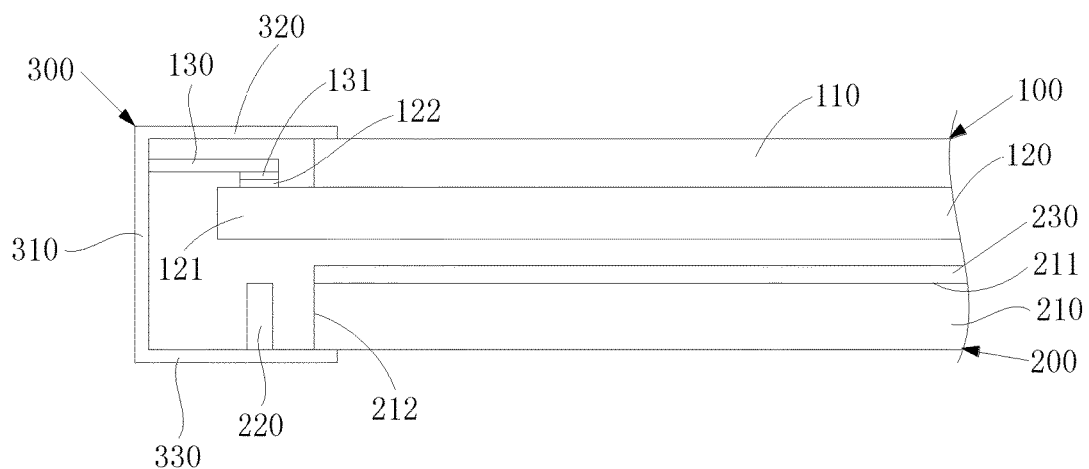
FIG. 3 is a structure diagram of an ultra-thin liquid crystal display according to another embodiment of the present disclosure.

FIG. 3 is a structure diagram of an ultra-thin liquid crystal display according to another embodiment of the present disclosure.

Referring to FIG. 3, a structure of the ultra-thin liquid crystal display differs from that of the ultra-thin liquid crystal display shown in FIGS. 1 and 2 in that the backlight module 200 further includes a total reflection layer 230.

The total reflection layer 230 is disposed on the light emission surface 211 of the glass plate 210 to totally reflect the light emitted from the LED light source 220 to the light emission surface 211. In the present embodiment, the configuration of the total reflection layer 230 resolves a problem of affecting a total reflective light guide plate mechanism due to there being no air layer above the light emission surface 211 of the glass plate 210. By disposing the total reflection layer 230, a layer structure approximate to an air layer is generated above the light emission surface 211 of the glass plate 210 to satisfy total reflection conditions, such that the light in the glass plate 210 are mixed uniformly, thereby emitting the uniformly mixed light to the liquid crystal panel 100.

In the present embodiment, in order to achieve the total reflection, a refractive index of the total reflection layer 230 is less than a refractive index of the glass plate 210. Furthermore, the total reflection layer 230 is a thin film layer made of $SiO_2$ material, but the present disclosure is not limited hereto.

Furthermore, in order to make the refractive index of the total reflection layer 230 made of $SiO_2$ material less than that of the glass plate 210, a thermal evaporation coating equipment or a sputtering coating equipment is adopted to form the total reflection layer 230 by coating on the light emission surface 211 of the glass plate 210 using a rapid deposition method or an oblique angle deposition method.

Figure 4:
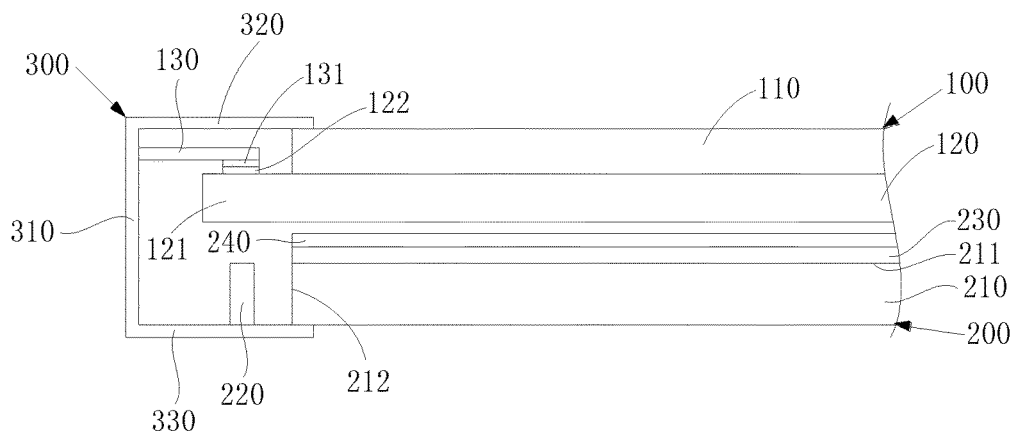
FIG. 4 is a structure diagram of an ultra-thin liquid crystal display according to another embodiment of the present disclosure.

FIG. 4 is a structure diagram of an ultra-thin liquid crystal display according to still another embodiment of the present disclosure.

Referring to FIG. 4, a structure of the ultra-thin liquid crystal display differs from that of the ultra-thin liquid crystal display shown in FIG. 3 in that the backlight module 200 further includes a protection layer 240.

The protection layer 240 is disposed on a surface of the total reflection layer 230 facing the array substrate 120 so as to protect the total reflection layer 230. For example, the disposition of the protection layer 240 may prevent the total reflection layer 230 from being damage by friction, or prevent moisture from entering the total reflection layer 230, thereby avoiding the affection on the refractive index of the total reflection layer 230.

Optionally, the protection layer 240 may be made of SiN, PFA, or the like, which is a polymer formed by a small amount of perfluoroethyl perfluorovinyl ether and polytetrafluoroethylene.

Figure 5:
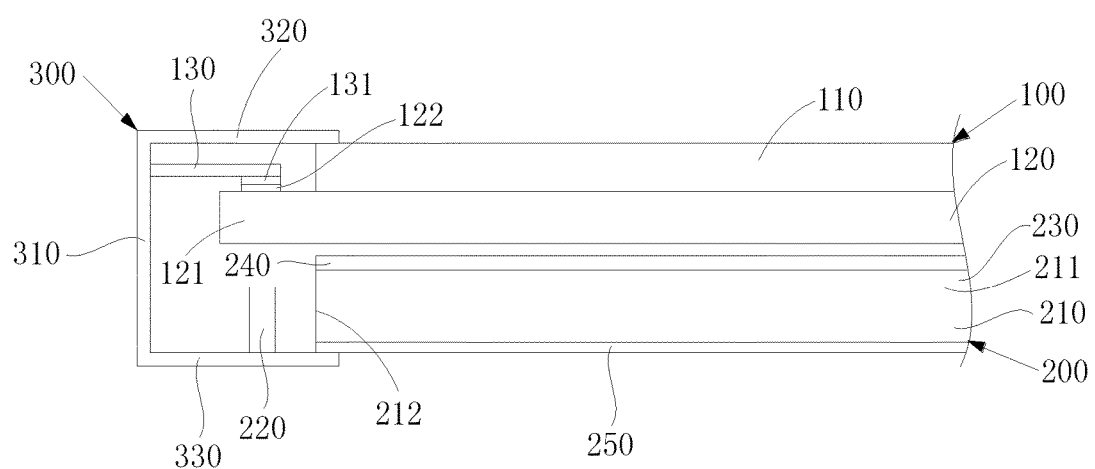
FIG. 5 is a structure diagram of an ultra-thin liquid crystal display according to still another embodiment of the present disclosure.

FIG. 5 is a structure diagram of an ultra-thin liquid crystal display according to still another embodiment of the present disclosure.

Referring to FIG. 5, a structure of the ultra-thin liquid crystal display differs from that of the ultra-thin liquid crystal display shown in FIG. 4 in that the backlight module 200 further includes a reflection sheet 250.

The reflection sheet 250 is disposed between the second horizontal part 330 of the metal frame 300 and a surface of the glass plate 210 opposite to the array substrate 120 (i.e., the bottom surface of the glass plate 210 opposite to the light emission surface 211) to reflect the light emitted from the LED light source 220 to the surface of the glass plate 210 opposite to the array substrate 120 back to the glass plate 210, thereby improving light utilization efficiency.

Optionally, the reflection sheet 250 may be made of a metal having high reflectivity (such as silver, gold) or formed by a combination of dielectric films having high reflectivity.

Although the present disclosure is described with reference to the special exemplary embodiments, those skilled in the art will understand that various changes in form and details may be made therein without departing from the spirit and scope of the invention as defined by the appended claims and its equivalents.

What is claimed is:

1. An ultra-thin liquid crystal display (LCD), comprising: a liquid crystal panel, a backlight module disposed opposite to the liquid crystal panel, and a metal frame for fixedly coupling the liquid crystal panel and the backlight module, wherein:

the liquid crystal panel comprises a color filter substrate disposed opposite to the backlight module, an array substrate positioned between the backlight module and the color filter substrate and disposed by box with the color filter substrate, and a chip-on-film (COF), and the array substrate comprises an extension part formed by extending one side thereof, wherein a screen electrode is formed on the extension part, an electrode on the COF is bonded with the screen electrode, and the COF is attached to the metal frame, wherein the backlight module comprises: a glass plate disposed opposite to the array substrate, and having a light incident side surface; and a LED light source disposed adjacent to the light incident side surface and opposite to the COF, wherein the metal frame comprises: a vertical part, and first and second horizontal parts formed by extending both opposite sides of the vertical part in a direction perpendicular to the vertical part, wherein the first horizontal part is clamped on the liquid crystal panel, the second horizontal part is clamped on the backlight module, and the COF is attached to the vertical part, and wherein the LED light source is positioned above the second horizontal part, and between the vertical part and the light incident side surface to dissipate heat.

2. The ultra-thin LCD of claim 1, wherein the backlight module further comprises:

a total reflection layer disposed on a surface of the glass plate facing the array substrate to totally reflect light emitted from the LED light source to a surface of the glass plate facing the array substrate.

3. The ultra-thin LCD of claim 2, wherein a refractive index of the total reflection layer is less than a refractive index of the glass plate.

4. The ultra-thin LCD of claim 2, wherein the total reflection layer is made of $SiO_2$ material.

5. The ultra-thin LCD of claim 2, wherein the backlight module further comprises: a protection layer disposed on a surface of the total reflection layer facing the array substrate to protect the total reflection layer.

6. The ultra-thin LCD of claim 3, wherein the backlight module further comprises: a protection layer disposed on a surface of the total reflection layer facing the array substrate to protect the total reflection layer.

7. The ultra-thin LCD of claim 4, wherein the backlight module further comprises: a protection layer disposed on a surface of the total reflection layer facing the array substrate to protect the total reflection layer.

8. The ultra-thin LCD of claim 1, wherein the backlight module further comprises:

a reflection sheet disposed on a surface of the glass plate opposite to the array substrate to reflect the light emitted from the LED light source to the surface of the glass plate opposite to the array substrate back to the glass plate.

9. The ultra-thin LCD of claim 1, wherein one COF is disposed opposite to the at least two LED light sources.

* * * * *